(12) United States Patent
Alark et al.

(10) Patent No.: US 8,744,728 B2
(45) Date of Patent: *Jun. 3, 2014

(54) FUEL SULFUR CONTENT-BASED OPERATION CONTROL OF A DIESEL ENGINE

(71) Applicant: Ford Global Technologies, LLC, Dearborn, MI (US)

(72) Inventors: Keli Alark, Dearborn, MI (US); Richard Kellogg Morton, Hagerstown, MD (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/927,030

(22) Filed: Jun. 25, 2013

(65) Prior Publication Data
US 2013/0345949 A1   Dec. 26, 2013

Related U.S. Application Data

(63) Continuation of application No. 13/615,169, filed on Sep. 13, 2012, now Pat. No. 8,478,510, which is a continuation of application No. 12/470,655, filed on May 22, 2009, now Pat. No. 8,315,779.

(60) Provisional application No. 61/101,533, filed on Sep. 30, 2008.

(51) Int. Cl.
| G06F 19/00 | (2011.01) |
| G06F 11/30 | (2006.01) |
| F02M 51/00 | (2006.01) |
| G01M 15/00 | (2006.01) |
| F01N 3/10 | (2006.01) |

(52) U.S. Cl.
USPC ......... 701/104; 123/479; 123/480; 701/105; 701/114; 73/114.49; 60/285; 702/185

(58) Field of Classification Search
USPC ..... 123/1 A, 198 A, 299, 300, 435, 478–480, 123/494; 701/101–195; 702/182, 183, 185; 60/274, 277, 285, 286, 295; 73/114.45, 73/114.49, 114.51, 114.69, 114.71, 73/114.75; 423/242.1, 242.2, 244.08; 340/438, 439
See application file for complete search history.

(56) References Cited

U.S. PATENT DOCUMENTS

| 5,195,482 | A | 3/1993 | Smith |
| 5,755,207 | A | 5/1998 | Kushibe |
| 6,123,910 | A | 9/2000 | Yoshii et al. |
| 6,988,490 | B2 | 1/2006 | Satou |
| 7,228,250 | B2 | 6/2007 | Naiman et al. |
| 7,370,521 | B1 | 5/2008 | Sandmann et al. |

(Continued)

FOREIGN PATENT DOCUMENTS

EP   1331373 A2   1/2003

*Primary Examiner* — Willis R Wolfe, Jr.
(74) *Attorney, Agent, or Firm* — Julia Voutyras; Alleman Hall McCoy Russell & Tuttle LLP

(57) ABSTRACT

Over a diesel engine's lifetime, engine efficiency may be reduced and some of this may be attributable to sulfur deposit accumulation in the engine. A method for controlling operation of a diesel engine operating on a fuel is provided. The method may include adjusting an injection of fuel to the engine in response to a sulfur content of the fuel.

15 Claims, 6 Drawing Sheets

(56) References Cited

U.S. PATENT DOCUMENTS

| | | |
|---|---|---|
| 7,409,822 B2 | 8/2008 | Asanuma |
| 7,438,664 B2 | 10/2008 | Saito |
| 7,624,568 B2 | 12/2009 | Ando et al. |
| 7,892,363 B2 | 2/2011 | Brooks |
| 8,315,779 B2 * | 11/2012 | Alark et al. .................. 701/104 |
| 8,478,510 B2 * | 7/2013 | Alark et al. .................. 701/104 |
| 2003/0205218 A1 | 11/2003 | McIntyre et al. |
| 2004/0139944 A1 | 7/2004 | Nakano et al. |

* cited by examiner

FUEL SULFUR CONTENT-BASED OPERATION CONTROL OF A DIESEL ENGINE

CROSS REFERENCE TO RELATED APPLICATION

The present application is a continuation of U.S. patent application Ser. No. 13/615,169 filed Sep. 13, 2012, which is a continuation of U.S. patent application Ser. No. 12/470,655 filed May 22, 2009, now U.S. Pat. No. 8,315,779, which claims the benefit of U.S. Provisional Application No. 61/101,533, filed on Sep. 30, 2008, entitled FUEL SULFUR CONTENT-BASED OPERATION CONTROL OF A DIESEL ENGINE, the entirety of each of which are hereby incorporated herein by reference for all purposes.

FIELD

The present application relates to a method for controlling operation of a diesel engine operating on a sulfur-containing fuel.

BACKGROUND AND SUMMARY

Diesel engines are typically used for on- and off-roadway vehicles, as well as marine, industrial, and military use. While most of the industrialized world's diesel fuel usage for on-highway applications is being reduced in sulfur content, high sulfur content fuel is still used in some markets and applications. Sulfur in diesel fuels can have many detrimental affects on modern high performance diesel engines, including accelerated wear, corrosion of internal components, and is particularly damaging to emission control equipment.

Further, the inventors have discovered sulfur-contaminated fuel can cause fuel injector fouling, at least in part by sulfur deposits. Injector fouling can affect fuel injection quantity and the spray pattern of fuel injectors, thereby leading to degraded engine power, and various other effects.

At least some of the above issues of fuel injector fouling are addressed by a method for controlling operation of a diesel engine operating on a sulfur containing fuel. The method may include adjusting an injection of fuel to the engine in response to a sulfur content of the fuel to compensate for degradation of fuel injectors.

For example, by adjusting fuel injection parameters based on sulfur content of the fuel, engine power can be maintained by compensating for the potential clogging of the injectors due to sulfur deposits.

In another example, some issues may be addressed by a method for monitoring operation of a diesel engine operating on such a fuel, the method comprising indicating fouling of a fuel injector in the engine in response to the sulfur content of the fuel. In this way, maintenance or other action may be taken to address high sulfur fuels.

In still another example, issues may be addressed by a method for controlling operation of a diesel engine operating on such fuel, the method comprising performing a fuel injector cleaning cycle in response to a sulfur content of the fuel. Again, by performing cleaning of the fuel injectors responsive to fuel sulfur content, degraded engine performance may be addressed.

In yet another example, issues may be addressed by a method for controlling operation of a diesel engine operating on such fuel, comprising: estimating a sulfur content of the fuel based on fuel injector performance; and adjusting operation based on the estimated sulfur content of the fuel. In some examples, the adjusting operation may include adjusting engine operation. In a further example, the method may include adjusting a sulfur decontamination cycle of an emission control device coupled to the engine, the cycle adjusted responsive to sulfur content of the fuel, the sulfur content correlated to injector performance of injectors coupled in the engine. In some examples, the fuel injector performance may include fuel injector effects on maximum engine power. In some examples, the fuel injector performance may include an amount of fuel injected for a given pulsewidth at a given set of operating conditions. The operating conditions may include injection pressure and/or engine speed. The amount of fuel injected may be calculated based on an exhaust air-fuel ratio and a mass airflow. In this way, improved performance may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DRAWINGS

Figure 1:
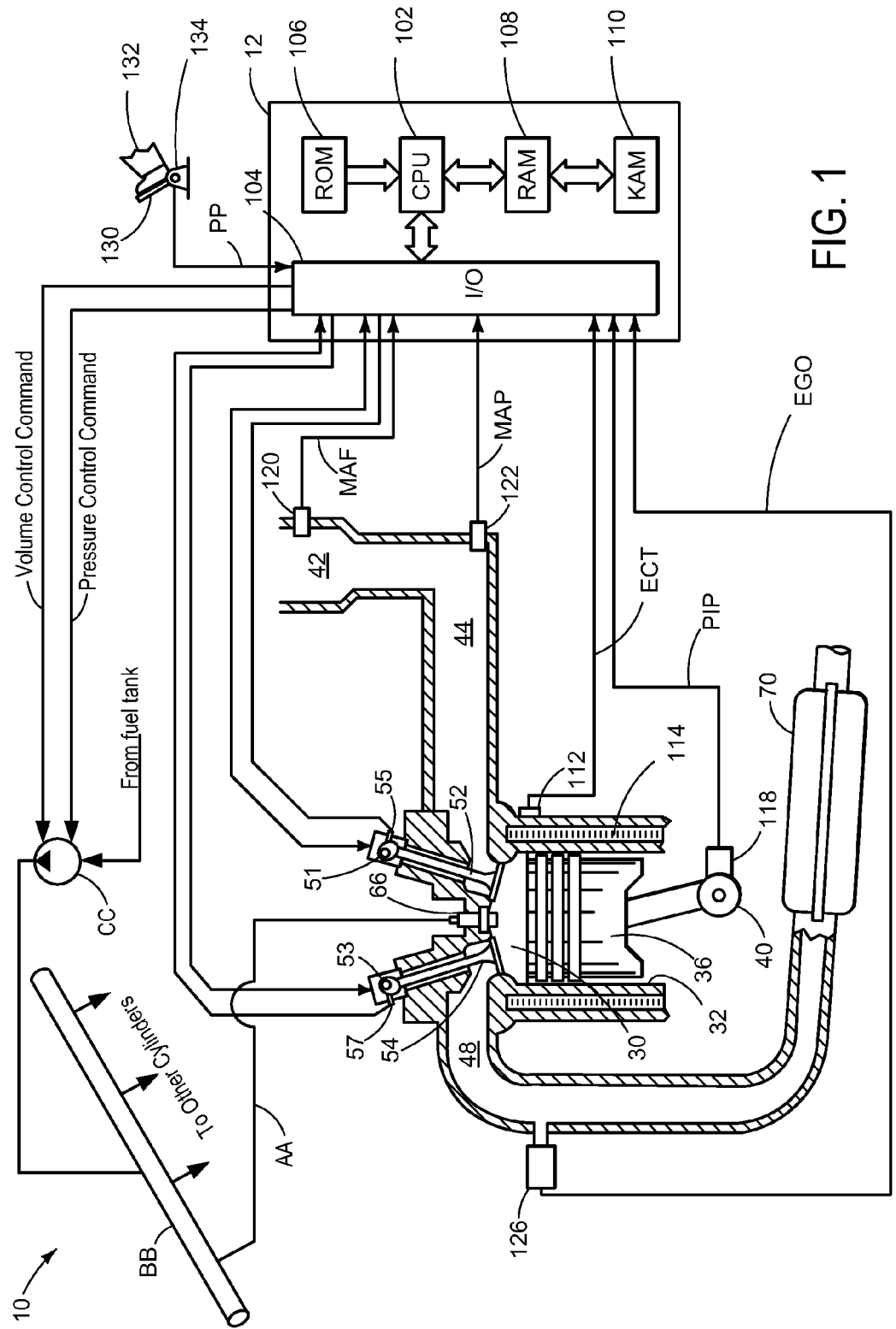
FIG. 1 shows a schematic diagram of a cylinder of multi-cylinder direct injection engine of a vehicle.
Figure 2A:
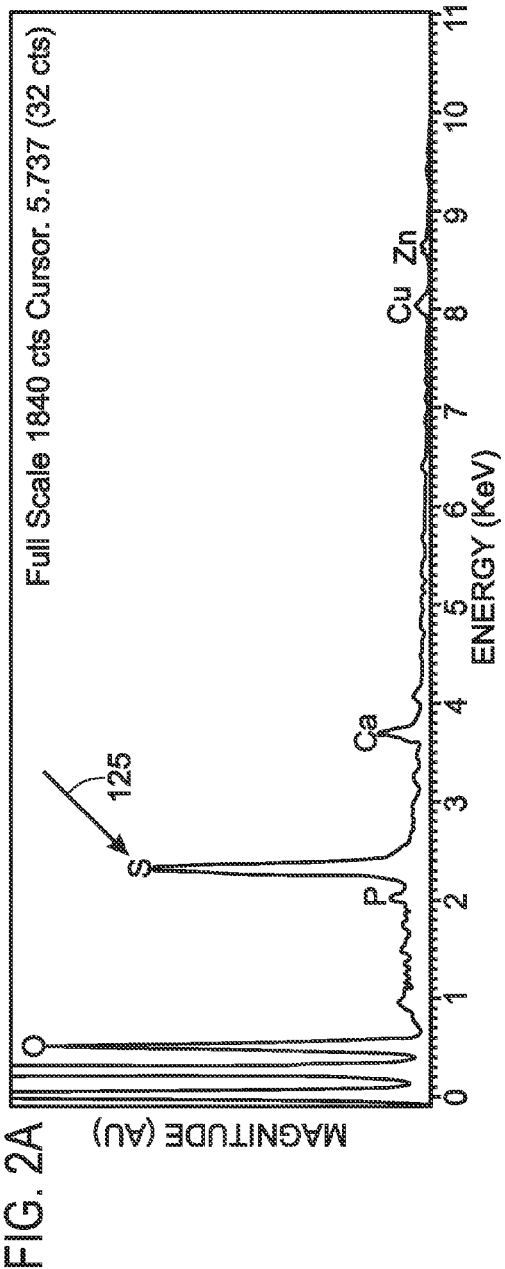
FIGS. 2A-2B show example energy dispersive spectroscopy graphs showing sulfur deposit amount on fuel injector tips, based on a sulfur content of the fuel used.
Figure 2B:
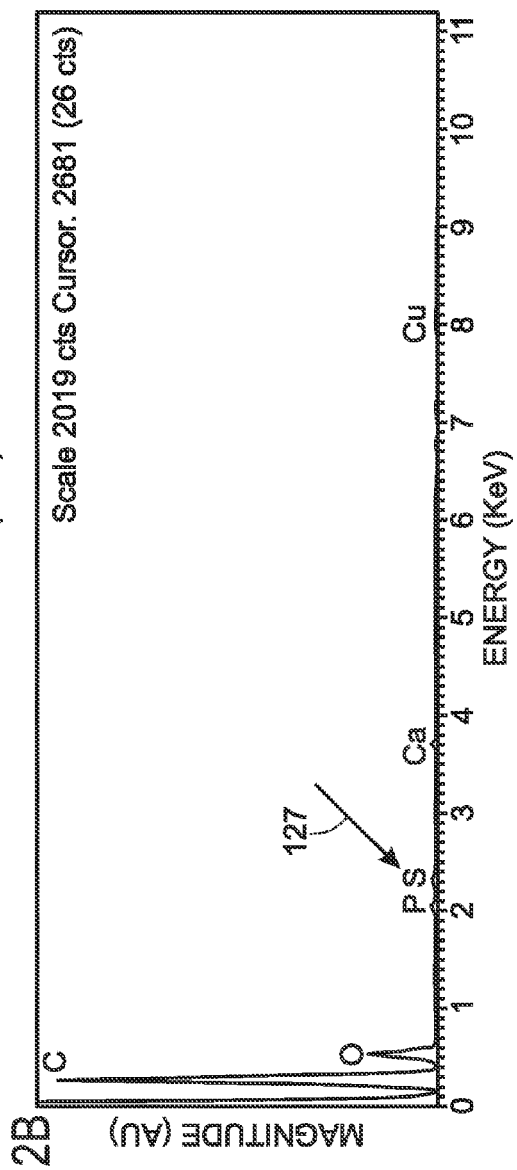
Figure 3:
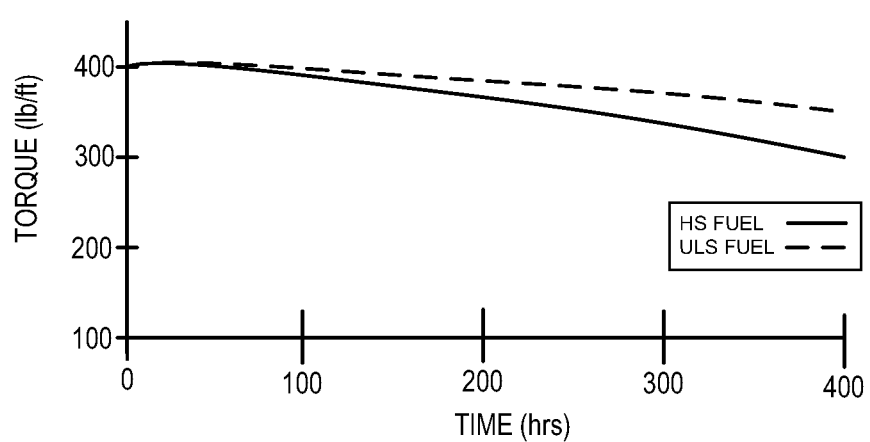
FIG. 3 shows an example graph showing reduction of engine power over time at the same engine speed.
Figure 4:
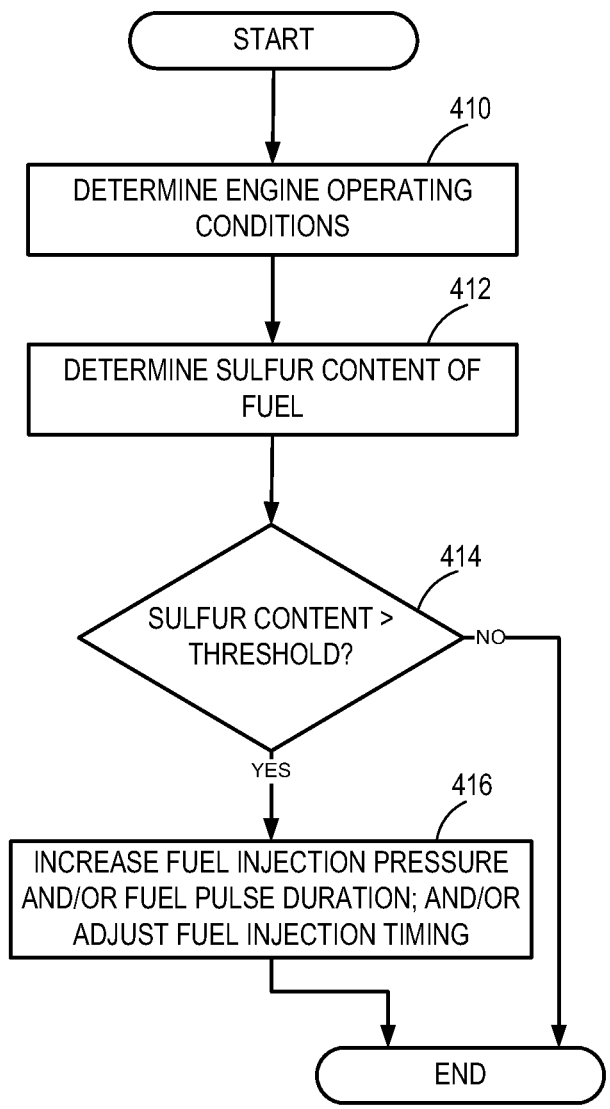
FIGS. 4-6 show example method flowcharts for operation control of a diesel engine based on sulfur content of the fuel.
Figure 5:
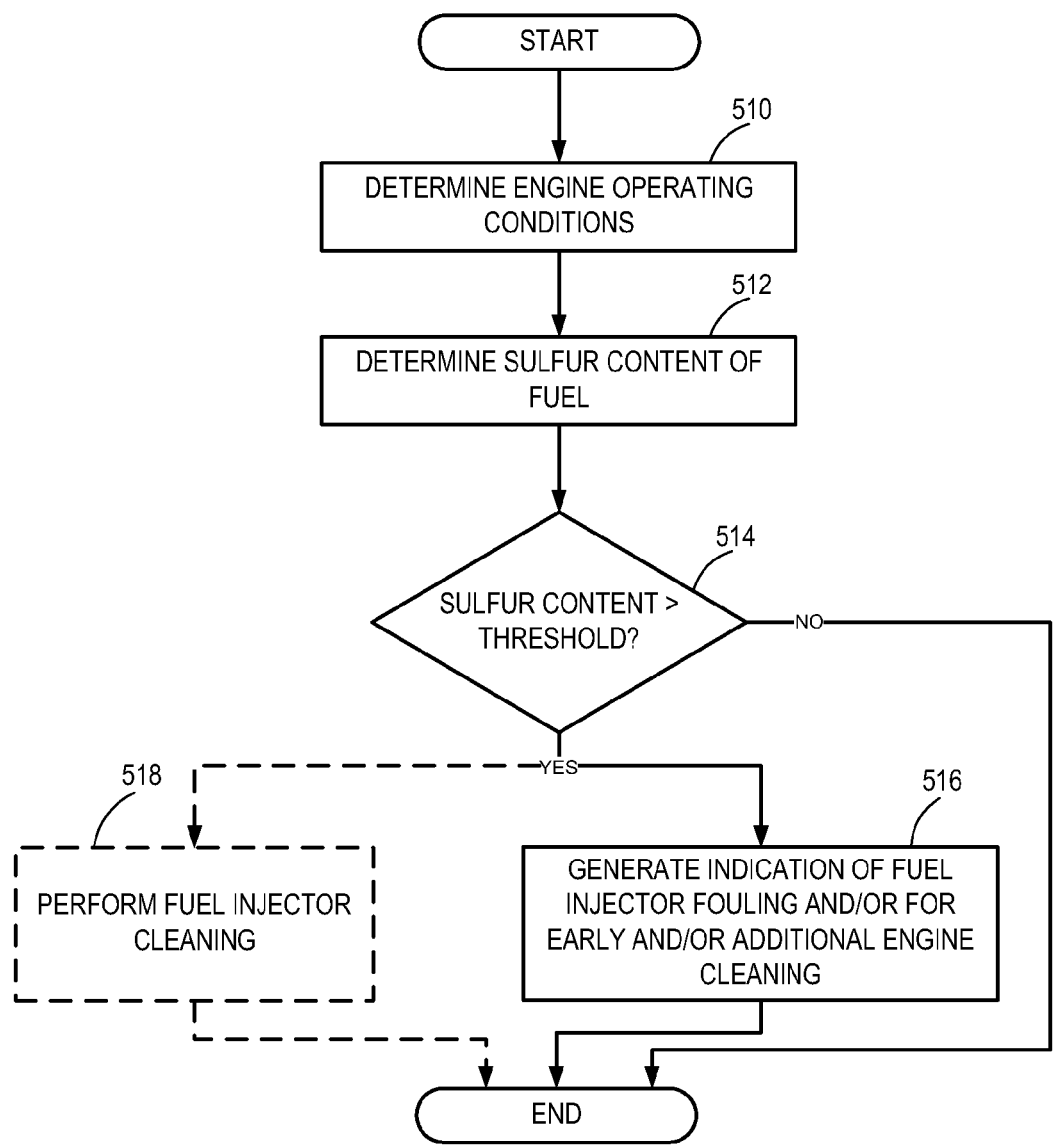
Figure 6:
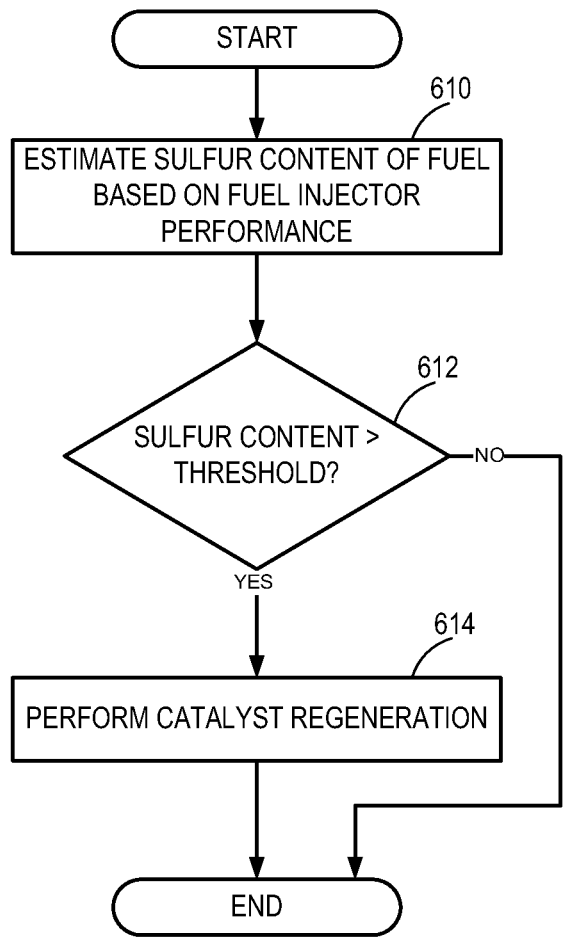

FIG. 1 shows an example cylinder of a multi-cylinder engine of a vehicle that may employ the present application. FIGS. 2A-2B show example graphs illustrating greater sulfur deposit on fuel injector tips that were dispensing HS fuel compared to those dispensing ultra-low sulfur (ULS) fuels. Accordingly, FIG. 3 shows example changes in torque output over time, for an engine using high sulfur (HS) fuel during an engine durability test and an engine using ultra-low sulfur (ULS) fuel during an engine durability test, thus illustrating that fuel injectors with greater sulfur deposits may have greater reductions in engine power. FIGS. 4-6 show example method flowcharts for addressing, responding to, diagnosing, and/or reducing the accumulation of sulfur deposit on fuel injectors to improve the maintenance of engine power and/or performance over time.

FIG. 1 shows a schematic diagram showing one cylinder of multi-cylinder engine 10, which may be included in a propulsion system of an a vehicle. Engine 10 may operate on a fuel, such as diesel fuel, which may include varying levels of sulfur. Engine 10 may perform compression ignition of injected fuel to thereby combust the fuel. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves, or the valve function may be accomplished via ports in the cylinder walls that are successively covered or uncovered by the piston.

In this example, intake valve 52 and exhaust valves 54 may be controlled by cam actuation via respective cam actuation systems 51 and 53. Cam actuation systems 51 and 53 may each include one or more cams.

Fuel injector 66 is shown coupled directly to combustion chamber 30 for injecting fuel directly therein in proportion to a signal received from controller 12. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by fuel tubes (AA) from an accumulator (or fuel rail) (BB), which receives fuel from a high pressure pump (CC).

The high pressure pump receives fuel from a fuel system (not shown) including a fuel tank, and a fuel pump. The high pressure pump varies the pressure and quantity of fuel supplied to the rail and subsequently to the injectors in response to signals from the ECU. The components as 10 described represent what is know as a High Pressure Common Rail fuel system, but the same functions can also be performed by other diesel fuel injection system designs such as pump-line nozzle, unit injector or hybrid systems, which employ different hardware components. The methods of the invention could be applied to any of these fuel injection systems with suitable adaptation.

Intake passage 42 may include a mass air flow sensor 120 and a manifold air pressure sensor 122 for providing respective signals MAF and MAP to controller 12.

An emission control device, such as converter 70 can include multiple catalyst bricks, in one example. In another example, multiple emission control devices, each with multiple bricks, can be used. Converter 70 can be a NOx catalyst, SCR catalyst, oxidation catalyst, particular filter, and/or combinations thereof.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor coupled to an accelerator pedal; a measurement of engine manifold pressure (MAP) from pressure sensor 122 coupled to intake manifold 44; a measurement of intake temperature (IT) or manifold temperature from a temperature sensor; an engine position sensor from a Hall effect sensor 118 sensing crankshaft 40 position; a measurement of exhaust temperature (ET) from temperature sensor 126; and a measurement of ambient temperature (AT) from external temperature sensor. In one aspect of the present description, engine position sensor 118 produces a predetermined number of equally spaced pulses every revolution of the crankshaft from which engine speed (RPM) can be determined.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, etc.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

As noted herein, the engine fuel, such as diesel fuel, may have varying levels of sulfur depending on the source of the fuel, etc. High sulfur levels in the fuel may generate deposits on the fuel injectors (e.g., injector 66). One approach to measure sulfur deposits on a fuel injector is to perform energy dispersive spectrometry (EDS) on the fuel injector, wherein peaks at particular energy levels indicate the presence and relative amount of an element. Specifically, when sulfur is present on a sample, a peak will appear around 2.3 KeV. FIG. 2A illustrates an example graph of energy dispersive spectrometry (EDS) of a fuel injector tip using HS fuel after an engine durability test.

This graph illustrates a peak at an energy level of 2.3 KeV, as indicated by arrow 125, indicating an amount of sulfur. FIG. 2B illustrates an example graph of EDS of a fuel injector tip using ULS fuel after the same test. The absence of a peak at 2.3 KeV in FIG. 2B, as indicated by arrow 127, indicates there may be greater sulfur deposits on the fuel injector tip using HS fuel compared to the fuel injector tip using ULS fuel. Further, greater sulfur deposits may be observed on the fuel injector using HS fuel by scanning electron microscopy.

Accordingly, FIG. 3 shows torque output of an engine using HS fuel (solid line) and an engine using ULS fuel (dashed line) during an engine durability test wherein engine speed was maintained throughout the test. As illustrated, the engine using HS fuel has a greater reduction in torque output compared to the engine using ULS fuel. This reduction may be attributed, at least in part, to fuel injector fouling as was discussed above with respect to FIGS. 2A-2B. Note also that the example graphs here are shown as one particular correlation; however, the actual graphs may vary due to engine configuration, engine design, operating cycles, etc.

From FIGS. 2A-3, it may be appreciated that the effect of sulfur on fuel injector deposits (and thus performance, e.g., the amount of fuel injected for a given pulsewidth (PW) at a given operating point, injection pressure, etc.) may be estimated based on the sulfur content of the fuel, along with various operating parameters, such as the number of hours the engine has operated, as just one example. In this way, it may be possible to estimate the amount of sulfur deposits as well as the reduction in engine power on-line in the engine control system. As noted further herein, such estimations may be used for compensating fuel injector sulfur deposits, such as to counteract such deposits, reduce further increases in deposits, reduce deposits, etc. In one example, sulfur content of the fuel may be used to adjust timing for fuel injector cleaning and/or catalyst regeneration.

A method for improving or maintaining torque output of an engine, based on sulfur content of a fuel, is shown as a flowchart in FIG. 4. Engine operating conditions (including engine speed, engine load, engine coolant temperature, oxygen concentration in intake manifold 44, number of hours of engine operation, etc.) may be determined at 410. The sulfur content of the fuel may be determined at 412. Sulfur content of the fuel may be determined by correlating fuel injector performance to the build-up of sulfur deposits on the fuel injector. In one example, the amount of fuel injected for a given PW, at given operating conditions (engine speed, engine load injection pressure, temperature, etc.) may be correlated to the sulfur content of the injected fuel. The amount of fuel actually injected may be identified from exhaust air-fuel ratio and mass air-flow, as just one example, or by comparing the fuel flow from the high pressure pump with the expected or commanded flow through the injectors. As the deposits build, less fuel may be injected for a given PW due to restrictions caused by the sulfur deposits. Thus, as the amount of fuel injected decreases over the operation of the engine, an estimate of fuel sulfur content may be generated. As one example, if the amount of fuel injected for a given set of conditions decreases by 5% after 200 hours of engine operation, this may correlate to a sufficiently high sulfur content to indicate that the sulfur content of the fuel is above a threshold value (e.g., an indication of HS fuel). For example, at 414, sulfur content of the fuel may be compared to a predetermined threshold. If sulfur content is higher than the threshold 414, among other conditions, fuel injection pressure and/or fuel pulse duration (that is, the duration of fuel injector opening) may be increased at 416 to counteract the reduction in engine power caused by fuel injector fouling. That is, as sulfur content of the fuel increases, the duration of fuel injector opening and fuel injection pressure may increase. Further, fuel injection timing may be adjusted at 416 to counteract the engine power reduction.

It may be appreciated that adjustments in injection pressure, duration of fuel pulse, injection timing, and/or other operating parameters based on sulfur content of the fuel, may be made by looking up predetermined values in prestored tables. Alternately, the adjustment values may be determined by an algorithm accounting for various parameters including engine operating conditions.

Referring now to FIG. 5, an example flowchart for indicating and/or performing fuel injector cleaning, based on sulfur content of the fuel, is illustrated. The flowchart may illustrate a method for monitoring operation of a diesel engine operating on a fuel. The method may include, at 510, engine operating conditions may be determined. Further, sulfur content of the fuel may be determined at 512, similar to the example in FIG. 4 described above. If sulfur content is above a predetermined threshold, at 514, and other operating conditions are met, an indication for early, and/or additional engine or injector cleaning may be generated at 516. In one example, this indication may include setting a diagnostic code in the controller 12. In another example, this indication may include displaying a message in a vehicle message center, for example as a graphic icon on an interior display. In one example, the message may identify issues related to the sulfur content of the fuel. For example, the message may identify that the fuel sulfur content is above a threshold limit. In another example, the message may request maintenance, or increased maintenance, related to fuel sulfur content (e.g., clean fuel injectors) or indicate said maintenance is being performed. Further, the indication may include an indication to perform fuel injector cleaning and/or fuel injector replacement of one or more fuel injectors. It may be appreciated that the indicating may occur earlier as sulfur content of the fuel increases. Further, it may be appreciated that the indicating may be directed to the electronic driver 68 or to the controller 12.

In another example, a fuel injector cleaning may be performed 518 by initiating a fuel injector cleaning cycle. For example, a fuel injector cleaning cycle may include increasing the temperature of combustion, thereby reducing or removing sulfur deposits. In one example, increased combustion temperature may be achieved by advancing injection timing. However, various other approaches may also be used, such as by increasing engine load, adjusting valve timing, etc.

By the examples described with respect to FIG. 5, accumulation of sulfur deposits on fuel injectors may be reduced.

A method for performing catalyst regeneration based on sulfur content of the fuel is shown as a flowchart in FIG. 6. In some cases the method may illustrate a method for controlling operation of a diesel engine operating on a fuel. Sulfur content of the fuel may be estimated based on fuel injector performance 610. In this example, and in other examples, fuel injector performance may include an amount of fuel injected for a given PW under a set of operating conditions, including injection pressure and engine speed, for example. Fuel injector performance may also be measured by changes in maximum engine output. At 612, it may be determined if the sulfur content of the fuel is greater than a predetermined threshold. If the answer is yes, catalyst regeneration may be performed 614 by, in one example, initiating sulfur decontamination cycles (e.g., fuel injector cleaning cycles) of an emission control device (e.g. catalytic converter 70) coupled to the engine. The sulfur decontamination cycles may include increasing exhaust temperature to a high level sufficient to remove sulfur under reducing (e.g., rich) exhaust operating conditions. It may be appreciated that the initiation of the sulfur decontamination cycles may be initiated earlier as sulfur content of the fuel increases or later as sulfur content of the fuel decreases. Further, timing of the sulfur decontamination cycles may be otherwise modulated. By modulating the catalyst regeneration based on sulfur content of the fuel, sulfur deposit accumulation may be reduced and/or prevented.

It may be appreciated that the application disclosed herein may thereby affect the quality and quantity of emissions and/or smoke from a diesel engine exhaust. Further, problems associated with clogged fuel injectors may be detected and/or fixed in a timely manner.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, two- or four-stroke, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling operation of a diesel engine operating on a fuel, comprising:
   adjusting a direct injection of fuel and fuel pressure to the engine in response to a sulfur content of the fuel, including adjusting injection timing responsive to the sulfur content of the fuel.

2. The method of claim 1, wherein the adjusting the direct injection of fuel includes adjusting a duration of fuel injector opening and/or adjusting an injection pressure wherein the duration of fuel injector opening increases as the sulfur content of the fuel increases and/or the injection pressure increases as the sulfur content of the fuel increases.

3. The method of claim 1, wherein adjusting injection timing includes advancing injection timing to initiate a fuel injector cleaning cycle.

4. A method, comprising:
   monitoring operation of a diesel engine operating on a directly injected fuel, including:
      indicating fouling of a direct fuel injector in the engine responsive to a sulfur content of the fuel, wherein the indicating includes setting a diagnostic code in a controller; and
      regenerating a catalyst responsive to the sulfur content by adjusting engine operation.

5. The method of claim 4, wherein the indicating includes generating a message in a vehicle message center.

6. The method of claim 5 wherein the message identifies issues related to the sulfur content of the fuel.

7. The method of claim 5 wherein the message identifies that the sulfur content of the fuel is above a threshold limit.

8. The method of claim 5 wherein the message requests maintenance or increased maintenance related to an increase in the sulfur content of the fuel.

9. The method of claim 4, wherein the indicating includes an indication to perform fuel injector cleaning and/or fuel injector replacement.

10. The method of claim 4, wherein the indicating is further responsive to operating conditions of the diesel engine.

11. The method of claim 4, wherein indications are generated earlier as the sulfur content of the fuel increases.

12. A method for controlling operation of a diesel engine operating on a fuel, comprising:
   during engine operation, performing a fuel injector cleaning cycle in response to a sulfur content of the fuel.

13. The method of claim 12, wherein performing includes performing the cycle earlier as the sulfur content of the fuel increases and performing the cycle later as the sulfur content of the fuel decreases.

14. The method of claim 12, wherein the fuel injector cleaning cycle includes increasing combustion temperature.

15. The method of claim 14, wherein the increasing combustion temperature is achieved by advancing fuel injection timing.

* * * * *